(12) United States Patent
Teague

(10) Patent No.: US 11,158,480 B2
(45) Date of Patent: Oct. 26, 2021

(54) COMBINED THERMAL AND VOLTAGE TRANSFER SYSTEM FOR AN X-RAY SOURCE

(71) Applicant: Philip Teague, Spring, TX (US)

(72) Inventor: Philip Teague, Spring, TX (US)

(73) Assignee: Visuray Intech Ltd (BVI), Tortola (VG)

( * ) Notice: Subject to any disclaimer, the term of this patent is extended or adjusted under 35 U.S.C. 154(b) by 0 days.

(21) Appl. No.: 16/654,875

(22) Filed: Oct. 16, 2019

(65) Prior Publication Data
US 2020/0051772 A1    Feb. 13, 2020

Related U.S. Application Data

(60) Provisional application No. 62/746,134, filed on Oct. 16, 2018.

(51) Int. Cl.
| | |
|---|---|
| *E21B 47/00* | (2012.01) |
| *E21B 47/01* | (2012.01) |
| *H05G 1/02* | (2006.01) |
| *H01J 35/12* | (2006.01) |
| *G01V 5/12* | (2006.01) |
| *G01V 5/10* | (2006.01) |
| *E21B 47/017* | (2012.01) |

(52) U.S. Cl.
CPC .............. *H01J 35/13* (2019.05); *E21B 47/00* (2013.01); *E21B 47/017* (2020.05); *G01V 5/10* (2013.01); *G01V 5/12* (2013.01); *H05G 1/02* (2013.01); *H01J 2235/0233* (2013.01)

(58) Field of Classification Search
CPC ......... E21B 47/00; E21B 47/017; G01V 5/10; G01V 5/12; H01J 35/13; H01J 2235/0233; H05G 1/02
See application file for complete search history.

(56) References Cited

U.S. PATENT DOCUMENTS

| | | |
|---|---|---|
| 4,264,818 A | 4/1981 | Petersen |
| 6,594,340 B2 | 7/2003 | Saito |
| (Continued) | | |

OTHER PUBLICATIONS

Notification of Transmittal of the International Search Report and the Written Opinion of the International Searching Authority, or the Declaration issued in the corresponding PCT International Application No. PCT/US2019/056553, dated Dec. 18, 2019 (13 pages).

*Primary Examiner* — Mark R Gaworecki
(74) *Attorney, Agent, or Firm* — Adams and Reese LLP; Raymond R. Ferrera

(57) ABSTRACT

A thermal control and electrical connection means for an electronic radiation source that provides a cooling and electrical connection to an electronic radiation source in high-temperature environment is provided, including at least a means for physically dislocating a positive high-voltage generator from the anode/target of the x-ray source; a means for conveying coolant fluids to a target anode along a coaxially formed connector; and a means for removing heat from the target anode along a coaxially-formed connector. A method of removing thermal energy from the target of an electronic radiation source is also provided, including at least introducing coolant fluids onto the target; removing coolant fluids from the target; and relocating the coolant fluids to another part of the tool for disposal within the wellbore.

6 Claims, 2 Drawing Sheets

(56) References Cited

U.S. PATENT DOCUMENTS

| | | |
|---|---|---|
| 8,481,919 B2 | 7/2013 | Teague |
| 2011/0044418 A1* | 2/2011 | Stubbers .................. G21B 1/19 376/116 |

* cited by examiner

COMBINED THERMAL AND VOLTAGE TRANSFER SYSTEM FOR AN X-RAY SOURCE

TECHNICAL FIELD

The present invention relates generally to methods and means for connecting to and simultaneously cooling the anode of an electronic x-ray device, thereby creating volumetric space for a detector apparatus found within a downhole cement and formation evaluation tool.

BACKGROUND

Well logging or borehole logging is the practice of making an accurate record, known as a well log, of the geologic formations through which a borehole creates a path or conduit. Well logging activities are performed during all phases of an oil and gas well's development; drilling and evaluation, completion, production and abandonment. The oil and gas industry logs rock and fluid properties to find hydrocarbon-bearing strata in the formations intersected by a borehole. The logging procedure consists of lowering a tool on the end of a wireline into the well to measure the properties of the formation. An interpretation of these measurements is then made to locate and quantify potential zones containing hydrocarbons and at which depths these zones exist.

Logging is usually performed as the logging tools are pulled out of the hole. This data is recorded in real-time via a data connection to the surface logging unit or using a memory unit aboard the tool to create either a printed record or electronic presentation called a well log which is then provided to the client. Well logging is performed at various intervals during the drilling of the well and when the total depth is drilled.

Density logging is the practice of using a specific well logging tool to determine the bulk density of the formation along the length of a wellbore. The bulk density is the overall density of a rock including the density of the minerals forming the rock and the fluid enclosed in the pores within the rock.

The use of radioactive isotopes within oilfield operations such as the production, logistics, handling, operational use and disposal of such sources is controlled by regulation. The transport of such isotopes across geographical and political borders is heavily regulated and controlled due to the risk associated with the potential to cause harm to humans, either accidentally or intentionally, through the direct dispersal of the radioactive materials across a populated region or indirectly via introduction into the food chain.

However, the use of such isotopes is tolerated as there has been no viable replacement for the technology until recently. The ability to replace radioactive isotopes with devices and methods which to not utilize radioactive materials provides a number of key advantages when considering all aspects of the operational cycle of a wellbore log, from commercial to health, safety and the environment.

For example, the use of 137Cs within oilfield operations is controlled through governmental regulation, export treaties and embargos. Generally, such isotopes are produced in a nuclear reactor in the country in which they are intended to be used. The transport of such isotopes across geographical and political borders is heavily regulated and controlled, due to the risk associated with the potential to cause harm to humans, either accidentally or intentionally, through the direct dispersal of the radioactive materials across a populated region or indirectly via introduction into the food chain.

After entering the body, 137Cs is generally uniformly distributed throughout the body, with higher concentrations manifesting in muscle tissues and lower concentrations in bones. The biological half-life of 137Cs is about 70 days. Experiments on canines showed that a single dose of 0.0038 Curie per kilogram is lethal within three weeks. Density logging operations in oilfield typically use 1.1 Curie of 137Cs, which equates of a small volume of material weighing 0.012 grams.

The improper handling of 137Cs gamma ray sources can lead to release of the radio-isotope and consequently radiation injuries. Cesium gamma-ray sources encased in metallic housings can be mixed-in with scrap metal on the way to smelters, resulting in production of steel contaminated with radioactivity.

In oilfield operations isotopes can be lost into the well as a result of the breakage of the logging tool at the risk of being irretrievable. Such events can lead to the closure of the well or measures taken to ensure that radioactive material cannot circulate or permeate out of the well. Indeed, direct contamination and the risk to oilfield workers of dangerous levels of exposure are not uncommon. Although comprehensive control measures are in place, the risk associated with the use of highly radioactive isotopes during oilfield operations will always be present—unless a viable isotope-free option can be introduced.

Various means have been published which attempt to mitigate this issue by using x-ray sources as a substitute for gamma-ray sources.

However, none of the prior art teaches how to adequately cool the anode or target of an x-ray tube that has been packaged such to fit within the narrow confines of a downhole tool housing. Moreover, none of the prior art teaches of a means of removing thermal energy from the target of a bi-polar x-ray source, wherein the target cannot be simply thermally connected to the ground-potential of the tool housing, as the target itself is elevated to very high positive potentials.

To produce x-radiation, relatively large amounts of electrical energy must be transferred to the x-ray tube. Only a small fraction (typically <1%) of the energy deposited in the x-ray tube's anode/target is converted into x-rays; most of the energy being converted to heat. If excessive heat is produced in the x-ray tube, the temperature will rise above critical values, and the tube can be damaged. This damage can be in the form of a melted anode or a ruptured tube housing.

One of the major challenges in developing x-ray tubes for modern, high performance, x-ray-based systems is to provide design features to accommodate the high levels of heat produced.

Known methods for the managing the heat include:
1. Rotating a circular anode, such that the electron beam impinges upon the anode to create a track, such that the amount of energy dissipated upon the anode at any given time is effectively spread over the area of the circular track;
2. Pulsing the high-voltage generator, such that the electron beam is not continually impinging upon the anode, or;
3. Varying the anode angle, so that the spot-size upon the physical target material is spread over a larger area.

An additional factor that must be considered is the tube housing. Excessive heat in the housing can rupture oil seals and/or plugs. Like the anode, the housing capacity places a limitation on the extended use of the x-ray tube, rather than on individual exposures.

Since the housing is generally cooled by the movement of air, or convection, its effective capacity can be increased by using forced air circulation.

Other prior art teaches various methods of using air or fluid flow through an electrically grounded anode to help remove excess thermal energy. However, none of the prior art teaches a method whereby a structure that is used to introduce and remove coolant fluids from an electrically high-potential anode is also used as a high-voltage connector.

For example, U.S. Pat. No. 8,481,919 to Teague teaches a method of producing Compton-spectrum radiation in a borehole without the use of radioactive isotopes, and describes rotating collimators around a fixed source installed internally to the apparatus, but does not have solid-state detectors with collimators. The reference further teaches use of conical and radially symmetrical anode arrangements to permit the production of panoramic x-ray radiation.

U.S. Pat. No. 7,564,948 to Wraight et al. discloses an x-ray source used as a replacement for a chemical source during density logging, along with various means of arranging the apparatus and associated power-supply. The reference also discloses a means for filtering the primary beam from the x-ray source such that a filtered dual-peak spectrum can be detected by a reference detector, which is then used to directly control (feedback) the x-ray tube voltage and current for stability purposes.

U.S. Pat. No. 6,594,340 to Saito discloses a rotary anode type X-ray tube apparatus. The housing is coupled by a cooler device to supply a coolant in the housing. The anode target is fixed to a rotary cylinder, which is rotatably supported by a stationary shaft. The stationary shaft is provided with an inner hollow space for guiding a coolant. The coolant guided in the housing is split into two flowing streams, and one of the streams is introduced into the space for cooling of stationary shaft.

U.S. Pat. No. 10,062,539 to Yanagisawa et al. discloses an anode capable of keeping the X-ray dose steady in an X-ray generating tube by preventing a crack in a connecting electrode layer, which electrically connects a target layer and an anode member.

U.S. Pat. No. 10,092,259 to Karlstedt discloses a methods of cooling objects such as X-ray tubes and detectors, etc. For example, one disclosed system can be used to cool an X-ray tube and detector with one chiller using a standard coolant loop.

U.S. Pat. No. 9,852,875 to Wall discloses an X-ray tube that includes a cathode, which is configured to generate an electron beam; and a round anode, which is configured to rotate such that the electron beam impinges on a rotating surface of the anode so as to emit at least one X-ray beam. An array of gas pipes is configured to direct gas onto the surface so as to cool the anode.

U.S. Pat. No. 9,892,883 to Anno et al. discloses a rotating-anode X-ray tube assembly including a rotating-anode X-ray tube, a housing, a coolant, a first shell, an X-ray shielding member, a second shell, and an air introduction unit. The first shell is provided apart from the housing and an envelope of the rotating-anode X-ray tube, and surrounds the envelope. The X-ray shielding member is provided between the first shell and the housing and apart from the housing. The second shell is provided apart from the housing to cause an airway to be formed between the second shell and the housing. The air introduction unit produces a flow of air in the airway.

U.S. Pat. No. 9,936,568 to Takahashi et al. discloses an X-ray generator capable of reducing invalid exposure caused due to wave tails, which do not contribute to the quality of an X-ray image, by preventing the wave tails from being supplied to an X-ray tube. An X-ray imaging apparatus includes the X-ray generator and a method of reducing the invalid exposure is implemented using the X-ray generator.

U.S. Pat. No. 10,020,157 to Hadland discloses a high-voltage generator for an x-ray source, an x-ray gun, an electron beam apparatus, a rotary vacuum seal, a target assembly for an x-ray source, a rotary x-ray emission target, and an x-ray source. The rotary vacuum seal includes a pumpable chamber at a position intermediate between high-pressure and low-pressure ends of a bore for a rotating shaft.

U.S. Pat. No. 10,032,597 to Ohashi et al. discloses an anode member including a first metal tube, and a second metal tube having a coefficient of thermal expansion that is larger than that of the first metal tube. A peripheral portion of a target is bonded to the anode member via a bonding material that is arranged so as to extend over the first metal tube and the second metal tube.

U.S. Pat. No. 6,286,998 to Dilick discloses an x-ray tube typically containing an insert for generating x-rays. The insert is housed in a housing wherein an insulating fluid circulates around the insert in the housing to provide thermal and electrical insulation. The present invention includes methods and apparatus for removing water from insulating oil.

U.S. Pat. No. 6,457,859 to Lu et al. discloses a CT scanner comprising a beryllium window mounted on an x-ray insert, a cooling fluid circulation line, and a cooling fluid return line. A plurality of fins are mounted in the cooling fluid circulation line. The fluid circulation line is in fluid communication with one of an anode side cavity and a cathode side cavity and in fluid communication with a heat exchanger.

SUMMARY

A thermal control and electrical connection means for an electronic radiation source that provides a cooling and electrical connection to an electronic radiation source in high-temperature environment, is provided, the means including at least a means of physically dislocating a positive high-voltage generator from the anode/target of the x-ray source; a means to convey coolant fluids to a target anode along a coaxially formed connector; and a means to remove heat from the target anode along a coaxially-formed connector.

A method of removing thermal energy from the target of an electronic radiation source, is also provided, the method including at least the introduction coolant fluids onto the target; the removal of coolant fluids from the target; and the relocation of the coolant fluids to another part of the tool for disposal within the wellbore.

BRIEF DESCRIPTION OF SEVERAL EXAMPLE EMBODIMENTS

The methods and means described herein enable the efficient and stable use of ultra-high voltage x-ray tubes and electronic radiation sources within the high-temperature environment of a borehole. A thermal control and electrical interconnect mechanism for an electronic radiation source in high-temperature environments is provided, the tool including at least an electronic radiation source where in the target is cooled by a structure that also conducts the high electrical potentials required of a bipolar electronic source configuration.

Figure 1:
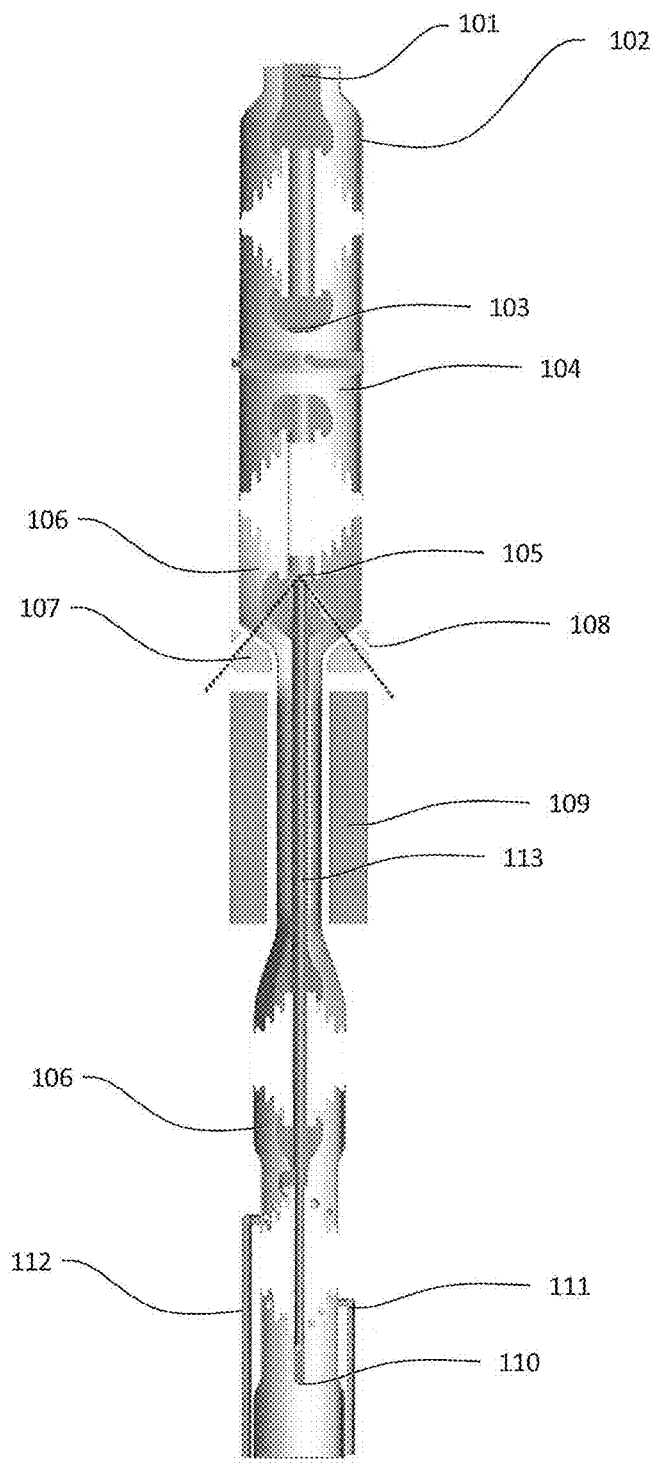
FIG. 1 illustrates an example narrow format bipolar configured x-ray tube wherein the target anode is simultaneously cooled and electrically connected via an electrically conductive and narrow format bi-direction fluid conduit.
Figure 2:
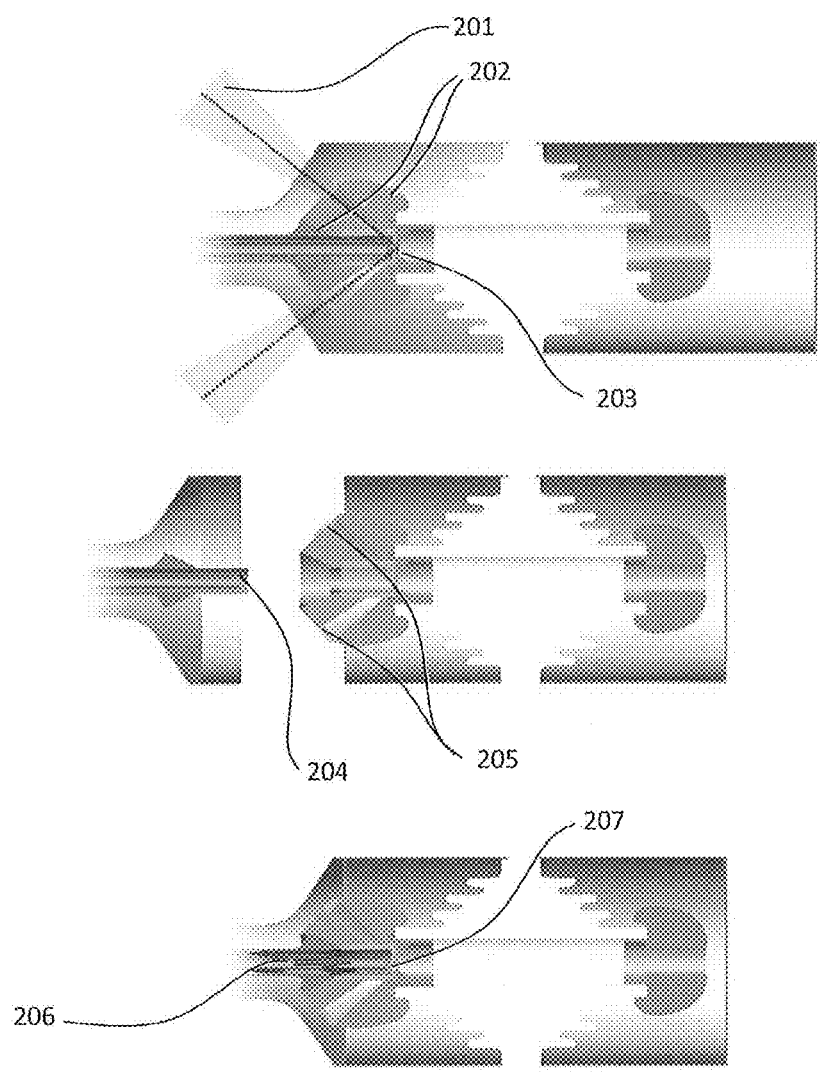
FIG. 2 illustrates an example method to connect an electrically conductive and narrow format bi-direction fluid conduit to a target anode, thereby permitting the removal of thermal energy from the target.

With reference now to the attached Figures, FIG. 1 illustrates a bipolar configured x-ray tube [102] with a high-voltage connector [101], that is further connected to a filament or cold-cathode device [103] contained within the vacuum enclosure of the tube [104]. Electrons from the filament are accelerated between the cathode [103] and anode [105], and impinge upon a target material [105]. Heat generated within the target [105] is removed by fluid circulation [111, 112] along the same conduit [113] that is employed as a high voltage connector to the target anode [105], via a high voltage connector [110]. The non-vacuum regions surrounding the high voltage elements, may be filled with a gaseous insulator [106]. A source beam collimator [107] may be placed around the target anode [105] to create specific beam paths [108] for the produced x-rays. One benefit of the compact and narrow integrated coolant and electrical connection conduit is that is provides for a substantial annular volume around the structure, which could be used for detector placement [109]. The anti-coronal structure [202] can also be used as a collimating shield to define a conical beam path [201] from x-rays emanating from the target [203]. The anti-coronal structure can comprise a plurality of different materials, thereby permitting a continuous surface while providing low attenuation windows [205] for the x-ray beam path. The end of the coolant conduit [204] once integrated with the target structure [207] permits lower temperature coolant [206, 111] to be circulated over the target structure [207], and removing heat to another part of the tool for disposal into the well bore via a higher-temperature return conduit [112].

In one embodiment, a bipolar x-ray tube consists a coaxial electrical conductor that connects the end of a positive high-voltage generator to the anode/target of an x-ray tube in a bipolar configuration. The coaxial electrical conductor also serves as a fluid conveyance conduit providing coolant fluid to the anode and removing said coolant fluid from the target/anode along the annulus of the coaxial connector. The coaxial connector is formed in such a way as to provide annular space within the housing of the downhole tool for detector systems associated with the downhole measurement. The coolant is injected and retrieved from the coaxial conductor system through a network of conduits formed to reduce the electrical field stress on the coolant fluid as the fluid path traverses from a high-electrical-field region to a low-electrical-field region.

In a further embodiment, the coolant is introduced onto or into the anode/target of the x-ray tube, and returns along the annulus of the coaxially-formed connector, thereby carrying excess thermal energy away from the hot source/target anode, while also providing a means of conveying a high-electrical potential to the anode/target of the x-ray source.

In a further embodiment, the coaxial structure bypasses annular ground-potential volumes located axially adjacent to the x-ray anode/target, such that the volume may be used for photo detectors used for geo-physical measurements, such as in x-ray cement evaluation, x-ray imaging, or litho-density measurements.

In a further embodiment, the arrangement would be housed within a wireline tool and conveyed into a borehole by means of wireline conveyance.

In a further embodiment, the arrangement is housed within a drill collar and conveyed into a borehole by means of LWD conveyance.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. A thermal control and electrical connection apparatus for an electronic radiation source that provides a cooling and electrical connection to an x-ray source in a high-temperature environment of a wellbore, said apparatus comprising:
   an internal length comprising a sonde section, wherein said sonde section further comprises an x-ray source;
   an array of detectors adjacent to said x-ray source; and
   a high voltage generator located axially adjacent to said detectors but dislocated from said x-ray source.

2. The apparatus of claim 1, further comprising a coaxial structure that bypasses annular ground-potential volumes located axially adjacent to an x-ray anode/target, such that a volume is used for radiation detectors used for geo-physical measurements.

3. The apparatus of claim 1, further comprising a pulsed neutron source.

4. A method of removing thermal energy from the target of an x-ray source, comprising:
   introducing coolant fluids onto a target anode;
   removing coolant fluids from a target anode; and
   relocating the coolant fluids to another part of a tool for disposal within a wellbore.

5. The method of claim 4, further comprising bypassing annular ground-potential volumes located axially adjacent to the x-ray target anode, such that the volume is used for radiation detectors used for geo-physical measurements.

6. The method of claim 4, further comprising removing thermal energy from the target of a pulsed neutron source.

* * * * *